_United States Patent Office_ 2,799,707
Patented July 16, 1957

2,799,707

PREPARATION OF ALPHA-DIKETONES

Otis C. Dermer, Stillwater, Okla., assignor to The Dow Chemical Company, Midland, Mich., a corporation of Delaware No Drawing. Application May 14, 1956,
Serial No. 584,463

20 Claims. (Cl. 260—590)

This invention relates to a new process for preparation of alpha-diketones, and more particularly to the preparation of alpha-diketones by the reaction of a hydroxy-ketone with an aldehyde in the presence of an acid catalyst.

Alpha-diketones, heretofore, have been made by conversion of ketones having an alpha-methylene group to nitroso compounds and hydrolyzing the nitroso compounds, or by mild oxidation of such ketones, acyloins, or vicinal disecondary glycols. For these processes the raw materials are difficult to obtain and the processes are troublesome to control so that consistent products and good yields are seldom obtained. It would be advantageous to have a simple process whereby high yields of alpha-diketones could be obtained from readily available raw materials.

It is, therefore, among the principal objects of this invention to provide a process for preparing alpha-diketones by a simple and economical method from readily available raw materials.

These and other objects may be accomplished by the invention, which comprises reacting a hydroxy-ketone having a general formula:

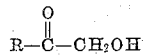

where R is an alkyl radical having from 1 to 3 carbon atoms with an aldehyde having a general formula:

$R_1$—CHO

where $R_1$ is a member of the group consisting of hydrogen, alkyl radicals having from 1 to 3 carbon atoms, and aryl radicals in the presence of an acid catalyst selected from the group consisting of HCl, HBr, and $H_2SO_4$. By this process, yields of diketones of over 83 percent may be obtained. The reaction which occurs may be represented by the following equation:

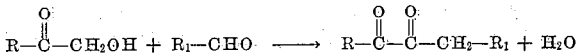

where R and $R_1$ represent radicals as previously defined.

Examples of the hydroxy-ketones that may be used are 1-hydroxy-2-propanone (acetol), and 1-hydroxy-2-butanone, 1-hydroxy-2-pentanone and others. Illustrative of the aldehydes that may be employed are formaldehyde, acetaldehyde, propionaldehyde, butyraldehyde, benzaldehyde, and other aldehydes except the olefinically unsaturated aldehydes. These react to produce a variety of diketones, among which are 2,3-butanedione, 2,3-pentanedione, 2,3-hexanedione, 2,3-heptanedione, and 1-phenyl-2,3-butanedione.

Theoretically, one mole of the aldehyde will react with one mole of the hydroxy-ketone. Since the hydroxy-ketones have a tendency to undergo a condensation reaction with themselves under the reaction conditions, it is preferred to use at least a stoichiometric amount, or a slight excess, of the aldehyde.

In the reaction a diluent, though not essential, may be preferably employed to control the reaction temperature. Some of the reactions of the hydroxy-ketones with the aldehydes are fairly rapid and a diluent may be used to slow down the reaction. In other reactions, the reaction mixture may have a high boiling point so that by using a diluent it is possible to carry out the reaction in a boiling mixture at a lower temperature. By using a boiling mixture, good mixing and a relatively uniform reaction temperature throughout the reacting mass can be obtained. Diluents, such as water, acetic acid, and toluene, are most often used. Water will form azeotropes with many of the diketones and thus may be conveniently used as a diluent. The diketones as a water azeotrope can be easily separated from the reaction mass by distillation. Other diluents, such as saturated hydrocarbons, other aromatic hydrocarbons in addition to toluene, the halogenated derivatives of these hydrocarbons, and ethers may also be used. The amount of diluent used is not critical. Usually a volumetric ratio of the diluent to the hydroxy-ketone employed is around 1:1 to 1:6.

The reaction may be simply carried out by placing the reactants in a reactor, with or without the diluent, and reacting the reactants until a substantial proportion of the reactants are converted to the diketone. The reaction temperature is not critical and a temperature below room temperature to the boiling point of the reaction mixture may be used. However, since the rate of reaction increases with temperature, a sufficiently high temperature should be employed to effect substantial conversion of the reactants to the diketone within a practical length of time. The optimum temperature will vary with the particular reaction, but a reaction temperature in the range of 90° to 120° C. with a reaction time of 0.5 to 5 hours is generally used. For reactants which react vigorously at low temperatures or those having a high boiling point, it is preferred to use a diluent so that the reaction may be carried out at these temperatures. In the reaction it may be advantageous to remove part of the product as it is formed. This may be easily done by combining the reactor with a fractionation tower. Thus the reactor may be used as a reboiler and the reaction mass continuously distilled. Usually a tower having from 10 to 30 theoretical plates is used. The reflux to the tower may be adjusted to obtain the desired distillate. The rate of distillation must be controlled so that sufficient reaction time is provided to convert the reactants to the diketone.

The acids which are effective in catalyzing the reaction are HCl, HBr, and $H_2SO_4$. HCl is preferred. Mere traces of the acid catalyst are ineffective, but as little as 0.1 weight percent, based upon the reaction mixture, will give reasonable yields when no diluents are used. When diluents are used, better yields may be obtained when the reaction mixtures contain from 1 to 10 weight percent acid, preferably from 3 to 5 weight percent.

In the preparation of the diketone, even though a fractionation tower is used in conjunction with the reactor, the distillate obtained from the tower will contain other constituents and it may be desirable to further purify the product. Usually, further distillation of the distillate will give a sufficiently pure product; however, the various techniques which are apparent to those skilled in the art may be used to recover and purify the alpha-diketones.

The following examples further illustrate the invention:

*Example 1*

A reactor equipped with a packed fractionating tower in which 20 theoretical plates could be realized was charged with 78.5 gm. of a mixture containing 93 weight percent acetol and 7 weight percent water and other impurities, 37.9 gm. of a mixture containing 95 weight percent paraformaldehyde, 200 ml. of water, and 32 ml. of concentrated hydrochloric acid containing 37 weight percent acid. The reactants were heated and the mixture slowly distilled.

At the beginning of the distillation a reflux ratio of 4 was maintained. The overhead temperature remained at 77° to 78° C. (the boiling point of the 2,3-butanedione-water azeotrope) for about 2 hours and then gradually rose. When the overhead temperature reached 85° C., the reflux ratio was increased to about 20 and the distillation continued until the overhead temperature reached 90° C.

The distillate collected consisted of 76 ml. of yellow oil layer and 20 ml. of an aqueous layer. The aqueous layer was found to contain 23 volume percent of the oil. The net yield of wet oil was 80.6 ml. (79.2 gm.). Distillation of the wet oil gave 71.3 gm. of pure 2,3-butanedione, B. P. 87.6° to 87.8° C. at 760 mm. pressure The 2,3-butanedione recovered represented a 83 percent yield based upon the acetol charged.

The above run was repeated except that 400 ml. of water and 52 ml. of the concentrated hydrochloric acid were used. The 2,3-butanedione recovered weighed 68.4 gm., which represented a 80 percent yield based upon the acetol charged.

The above run was repeated except that 81.4 gm. of the acetol mixture, 39.3 gm. of the paraformaldehyde mixture, 200 ml. of water, and 16 ml. of the concentrated hydrochloric acid were reacted. The 2,3-butanedione recovered weighed 73.3 gm., which represented an 82 percent yield on the acetol charge.

*Example II*

A glass 1-liter flask equipped with a condenser was charged with 78.5 gm. of a mixture containing 93 weight percent acetol and 7 weight percent water and other impurities, 106.1 gm. of benzaldehyde, and 150 ml. of toluene. These constituents were mixed and 3 gm. of hydrogen chloride were added. The mixture was slowly distilled. During the distillation, 23 ml. of water-toluene azeotrope were obtained and then pure toluene came over. While some toluene still remained in the reaction mixture, the distillation was discontinued. The reaction product in the flask was washed with water, and then distilled under reduced pressure.

A fraction boiling from about 90° C. at 50 mm. pressure to 111° C. at 12 mm. pressure was collected. This fraction was redistilled at 4 mm. pressure. After the removal of the benzaldehyde, 45 gm. of 1-phenyl-2,3-butanedione boiling at 80° to 90° C. (mostly at 81° C.) were obtained. The product had a freezing point of 10° to 15° C., density of 1.073 gm./ml. at 24° C., and a refractive index of 1.5194 at 24° C.

*Example III*

The reactor described in Example I was charged with 78.5 gm. of a mixture containing 93 weight percent acetol and 7 weight percent water and other impurities, 52.8 gm. of acetaldehyde as paraldehyde, 100 ml. of water, and 20 ml. of concentrated hydrochloric acid containing 37 weight percent acid. This mixture was allowed to stand for 60 hours, then distilled through the packed column. The 2,3-pentanedione-water azeotrope distilled at 83° to 84° C. The distillation was continued until the overhead temperature reached 90° C.

The distillate obtained contained 70 ml. of an oil layer and 26.5 ml. of a water layer. These were processed to obtain 50 ml. of dry 2,3-pentanedione. This represented a recovered yield of the diketone of 48 percent based upon the acetol charged.

*Example IV*

The reactor as described in Example I was charged with 78.5 gm. of a mixture containing 93 weight percent acetol and 7 weight percent water and other impurities, 69.6 gm. of propionaldehyde, and 10 ml. of concentrated hydrochloric acid containing 37 weight percent acid. There was a vigorous reaction.

The mixture was distilled using a reflux ratio of 4. The first distillate obtained was unreacted propionaldehyde in the amount of 14.5 gm. and then the 2,3-hexanedione-water azeotrope came off at about 89° C. When 47 ml. of oil layer and 22 ml. of the water layer were collected, about 50 ml. of water was added to the reactor and the distillation resumed at a reflux ratio of around 20. The distillation was continued until the overhead temperature of 94° C. was reached, which resulted in obtaining an additional 10 ml. of the oil layer and 6 ml. of the water layer. Redistillation of the oil layer gave 46 ml. of 2,3-hexanedione and 1 ml. of propionaldehyde.

What is claimed is:

1. A process for preparation of alpha-diketones, which comprises reacting a hydroxy-ketone having the general formula:

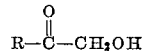

where R is an alkyl radical having from 1 to 3 carbon atoms with an aldehyde having the general formula:

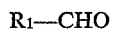

where $R_1$ is a member of the group consisting of hydrogen, alkyl radicals having from 1 to 3 carbon atoms, and aryl radicals, in the presence of an acid catalyst selected from the group consisting of HCl, $H_2SO_4$, and HBr.

2. A process for preparation of 2,3-butanedione, which comprises reacting formaldehyde with acetol in the presence of hydrochloric acid until a substantial proportion of the reactants are converted to 2,3-butanedione.

3. A process for preparation of 2,3-butanedione, which comprises intermixing formaldehyde, acetol, and hydrochloric acid in a proportion such that the acid concentration in the mixture is in the range of 0.1 to 5.0 weight percent, reacting the mixture at a temperature in the range of 90° to 120° C. for a length of time from 0.5 to 5 hours, and recovering the 2,3-butanedione.

4. A process for preparation of 2,3-butanedione, which comprises intermixing formaldehyde, acetol, and sulfuric acid in a proportion such that the acid concentration in the mixture is in the range of 0.1 to 5.0 weight percent, reacting the mixture until a substantial proportion of the reactants are converted to 2,3-butanedione, and recovering the 2,3-butanedione.

5. A process for preparation of 2,3-pentanedione, which comprises reacting acetaldehyde with acetol in the presence of hydrochloric acid until a substantial proportion of the reactants are converted to 2,3-pentanedione.

6. A process for preparation of 2,3-pentanedione, which comprises intermixing acetaldehyde, acetol, and hydrochloric acid in a proportion such that the acid concentration in the mixture is in the range of 0.1 to 5.0 weight percent, reacting the mixture at a temperature in the range of 90° to 120° C. for a length of time from 0.5 to 5 hours, and recovering the 2,3-pentanedione.

7. A process for preparation of 2,3-pentanedione, which comprises intermixing acetaldehyde, acetol, and sulfuric acid in a proportion such that the acid concentration in the mixture is in the range of 0.1 to 5.0 weight percent, reacting the mixture until a substantial proportion of the reactants are converted to 2,3-pentanedione, and recovering the 2,3-pentanedione.

8. A process for preparation of 2,3-hexanedione, which comprises reacting propionaldehyde with acetol in the presence of hydrochloric acid until a substantial proportion of the reactants are converted to 2,3-hexanedione.

9. A process for preparation of 2,3-hexanedione, which comprises intermixing propionaldehyde, acetol, and hydrochloric acid in a proportion such that the acid concentration in the mixture is in the range of 0.1 to 5.0 weight percent, reacting the mixture at a temperature in the range of 90° to 120° C. for a length of time from 0.5 to 5 hours, and recovering the 2,3-hexanedione.

10. A process for preparation of 1-phenyl-2,3-butanedione, which comprises reacting benzaldehyde with acetol in the presence of hydrochloric acid until a substantial proportion of the reactants are converted to 1-phenyl-2,3-butanedione.

11. A process for preparation of alpha-diketones, which comprises reacting a hydroxy-ketone having the general formula:

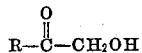

where R is an alkyl radical having from 1 to 3 carbon atoms with an aldehyde having the general formula:

where $R_1$ is a member of the group consisting of hydrogen, alkyl radicals having from 1 to 3 carbon atoms, and aryl radicals, in an inert diluent in the presence of an acid catalyst selected from the group consisting of HCl, HBr, and $H_2SO_4$.

12. A process according to claim 11, wherein the diluent used is water.

13. A process for preparation of 2,3-butanedione, which comprises intermixing, in an inert diluent, formaldehyde, acetol, and hydrochloric acid in a proportion such that the acid concentration is in the range of 1 to 10 weight percent, reacting the mixture until a substantial proportion of the reactants are converted to 2,3-butanedione, and recovering the 2,3-butanedione.

14. A process for preparation of 2,3-butanedione, which comprises intermixing formaldehyde, acetol and hydrochloric acid in a diluent of water wherein the acid concentration is in the range of 3 to 5 weight percent and the amount of diluent is in a volumetric ratio of the diluent to acetol in the range of 1:1 to 1:6, reacting the mixture at a temperaure in the range of 90° to 120° C. for a length of time of 0.5 to 5 hours, and separating the 2,3-butanedione formed.

15. A process for preparation of 2,3-pentanedione, which comprises intermixing, in an inert diluent, acetaldehyde, acetol, and hydrochloric acid in a proportion such that the acid concentration is in the range of 1 to 10 weight percent, reacting the mixture until a substantial proportion of the reactants are converted to 2,3-pentanedione, and recovering the 2,3-pentanedione.

16. A process for preparation of 2,3-pentanedione, which comprises intermixing acetaldehyde, acetol, and hydrochloric acid in a diluent of water wherein the acid concentration is in the range of 3 to 5 weight percent and the amount of diluent is in a volumetric ratio of the diluent to acetol in the range of 1:1 to 1:6, reacting the mixture at a temperature in the range of 90° to 120° C. for a length of time of 0.5 to 5 hours, and separating the 2,3-pentanedione formed.

17. A process for preparation of 2,3-hexanedione, which comprises intermixing, in an inert diluent, propionaldehyde, acetol, and hydrochloric acid in a proportion such that the acid concentration is in the range of 1 to 10 weight percent, reacting the mixture at a temperature in the range of 90° to 120° C. for sufficient time to obtain substantial conversion of the reactants to 2,3-hexanedione, and recovering the 2,3-hexanedione.

18. A process for preparation of 2,3-hexanedione, which comprises intermixing propionaldehyde, acetol, and hydrochloric acid in a diluent of water wherein the acid concentration is in the range of 3 to 5 weight percent and the amount of diluent is in a volumetric ratio of the diluent to acetol in the range of 1:1 to 1:6, reacting the mixture at a temperature in the range of 90° to 120° C. for a length of time of 0.5 to 5 hours, and separating the 2,3-hexanedione formed.

19. A process for preparation of 1-phenyl-2,3-butanedione, which comprises intermixing benzaldehyde, acetol, and hydrochloric acid in a diluent of toluene wherein the acid concentration is in the range of 1 to 10 weight percent and the amount of diluent is in a volumetric ratio of the diluent to acetol in the range of 1:1 to 1:6, reacting the mixture at a temperature in the range of 90° to 120° C. for sufficient length of time to obtain substantial conversion of the reactants to 1-phenyl-2,3-butanedione, and recovering the 1-phenyl-2,3-butanedione.

20. A process for preparation of 2,3-butanedione, which comprises intermixing formaldehyde, acetol, and hydrochloric acid in a diluent of water wherein the acid concentration is in the range of 3 to 5 weight percent and the amount of diluent is in a volumetric ratio of the diluent to acetol in the range of 1:1 to 1:6, reacting the mixture, and distilling the mixture to remove the 2,3-butanedione from the mixture as it is formed.

No references cited.